Figure 1:
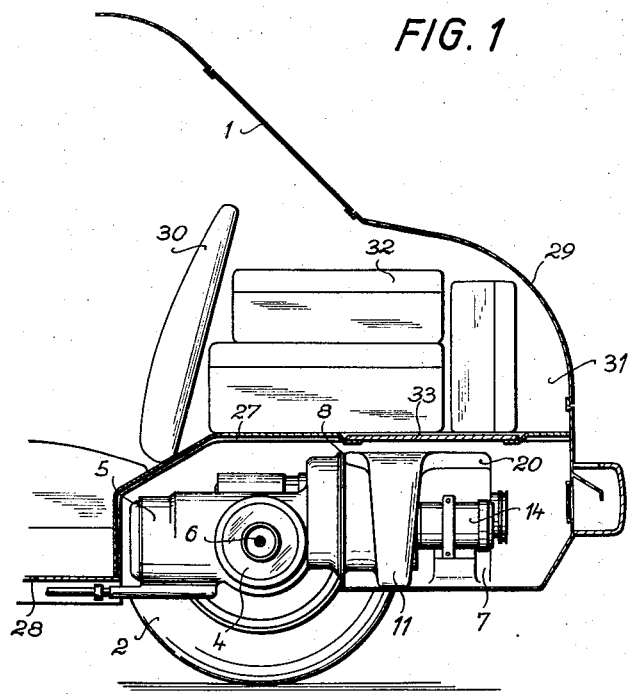

Aug. 18, 1959   F. PORSCHE ET AL   2,900,035
DRIVE AGGREGATE FOR MOTOR VEHICLES
Filed Aug. 20, 1956   2 Sheets-Sheet 1

INVENTORS
FERDINAND PORSCHE
AND HANS H. HÖNICK
BY Dicke and Craig
ATTORNEYS.

Aug. 18, 1959  F. PORSCHE ET AL  2,900,035
DRIVE AGGREGATE FOR MOTOR VEHICLES
Filed Aug. 20, 1956  2 Sheets-Sheet 2

INVENTORS
FERDINAND PORSCHE
AND HANS H. HÖNICK
BY  *Dicke and Craig*
ATTORNEYS.

United States Patent Office 2,900,035
Patented Aug. 18, 1959

2,900,035
DRIVE AGGREGATE FOR MOTOR VEHICLES

Ferdinand Porsche, Stuttgart, and Hans Hermann Hoenick, Stuttgart-Zuffenhausen, Germany, assignors to Firma Dr. Ing. h.c.F. Porsche KG, Stuttgart-Zuffenhausen, Germany Application August 20, 1956, Serial No. 604,955

Claims priority, application Germany September 8, 1955

7 Claims. (Cl. 180—57)

The present invention relates to a drive aggregate for motor vehicles with an air-cooled internal combustion engine arranged behind the rear axle and with a change-speed transmission arranged forwardly of the rear axle.

The drive aggregates known in the prior art together with the necessary auxiliary devices and installations require a relatively large constructional height. As a result thereof, aside from the relatively small space ordinarily available behind the rear seats, no space is available in the rear of these vehicles for accommodating luggage and the like.

According to the present invention, the difficulties encountered in the prior art devices are avoided by an in-line engine provided with horizontal cylinders and a crankshaft extending in the longitudinal direction whereby the engine is cooled by means of a radial blower arranged oppositely to the cylinders.

A compact, relatively low drive aggregate results from the use of such a construction in which the engine takes on a contour which is smooth and block-like whereby not only space is saved but also the support or mounting of the engine involves no difficulties. The space above the drive aggregate gained in this manner enables the accommodation of larger pieces of luggage, of the spare wheel or the like so that a favorable spatial arrangement and weight distribution results therefrom, especially in connection with small vehicles.

Preferably, the cooling blower is arranged approximately at the height of the cylinders and the axis thereof extends parallel to the crankshaft axis so that the cooling blower remains within the outlines or contours of the engine. The blower contains a twin-blower rotor which is driven at a rotary speed corresponding to that of the crankshaft of the engine. Notwithstanding the small specific rotational speed of the blower rotor a sufficient quantity of air is supplied thereby for purposes of cooling the engine so that the blower exhibits a substantial quietness in operation.

A constructional simplification may further be achieved in accordance with the present invention if the crankcase of the engine forms a part of the cooling air housing which surrounds the blower rotor. Moreover, since the relatively cool cooling-air sweeps along the walls of the crankcasing, the need for an oil cooler is obviated. Furthermore, the section of the cooling-air duct system which covers the cylinders lies within the contours of the housing containing the engine clutch and thereby forms the upper limit of the drive aggregate. In addition thereto, the auxiliary installations which are necessary to maintain operation of the internal combustion engine, such as, for example, carburetor, fuel pump, muffler and air inlet silencer and the like are arranged in a relatively flat manner on both sides of the engine so that they do not extend in a vertical direction beyond the contours of the drive aggregate defined by the crankcasing and the blower system.

Accordingly, it is an object of the present invention to provide a space-saving arrangement for rear engine vehicles which permit the accommodation of relatively large objects such as luggage or spare wheels in the rear of the vehicle.

Another object of the present invention resides in the provision of a rear engine vehicle wherein the drive aggregate is of compact and relatively low construction and offers a smooth, block-like appearance.

A still further object of the present invention is a rear-driven engine, especially for small vehicles which offers better space and weight distribution, and wherein the blower for the cooling system of the engine lies within the contours of the block-like construction of the engine block.

Still another object of the present invention resides in the provision of a radial blower for cooling an air-cooled internal combustion engine arranged rearwardly of the rear axle wherein the axis of the radial blower is parallel to the crankshaft of the engine.

A further object of the present invention resides in the provision of a rear engine construction which is simplified by arranging the housing containing the air ducts for the cooling blower within the contours of the engine block.

Still another object of the present invention resides in the provision of a cooling system for rear engines of motor vehicles which not only excells by its compactness but which is so constructed as to obviate the need for oil coolers.

Still another object of the present invention is the provisions of a rear engine arrangement of motor vehicles in which the auxiliary devices and mechanisms are arranged on both sides of the engine block in an essentially flat manner so that the contour formed by the driving aggregate and the cooling blower system is not exceeded thereby in the vertical direction.

Figure 2:
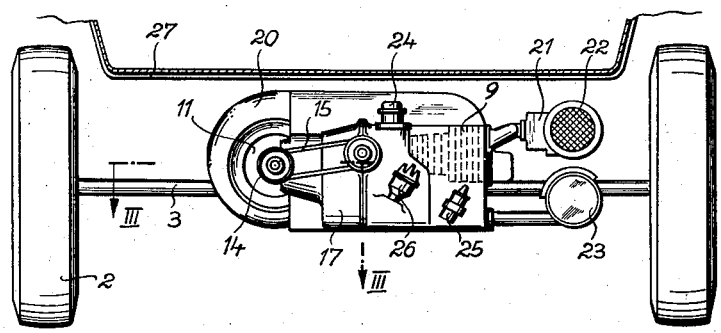
Figure 3:
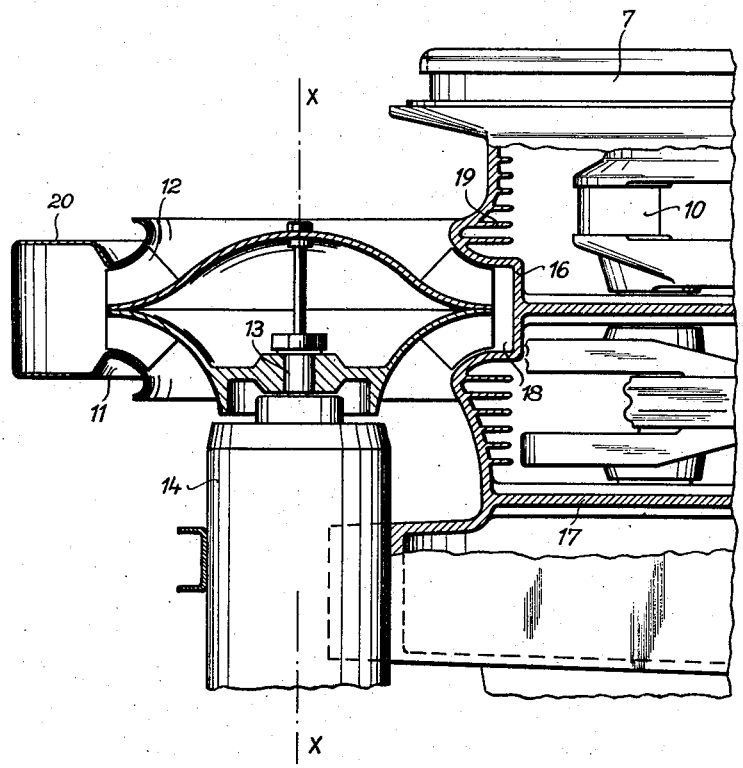

These and other objects, features and advantages of the present invention will become more obvious from the following description when taken in connection with the accompanying drawing which shows, for purposes of illustration only, one preferred embodiment in accordance with the present invention, and wherein Figure 1 is a longitudinal cross-sectional view through the rear of a motor vehicle provided with a drive aggregate in accordance with the present invention, Figure 2 is a rear view of the drive aggregate of Figure 1 in accordance with the present invention, and Figure 3 is a cross-sectional view taken along line III—III of Figure 2.

Referring now to the drawing, wherein like reference numerals are used throughout the various views to designate like parts, reference numeral 1 designates the rear window in the body of the motor vehicle which supports itself, in a known manner, on the wheels 2 which in turn are carried by the swinging half axles 3. The drive of the wheels 2 takes place from a differential gear 4 via a change-speed gear 5 which is arranged forwardly of the rear axle 6. An internal combustion engine 7 which is arranged rearwardly of the rear axle 6 is flangedly connected in a self-supporting manner with the change-speed transmission 5 via a clutch housing 8.

The internal combustion engine 7 is constructed as an in-line engine provided with horizontally disposed cylinders 9 and a longitudinally extending crankshaft 10. The engine is cooled by means of a radial blower 11 which is arranged opposite to and at the height of the cylinders 9. The axis X—X of the cooling blower 11 (Figure 3) extends parallel to the crankshaft 10. The cooling blower contains a twin-blower rotor 12 which is splined to a shaft 13 of a generator 14 and is driven via the generator 14 by a belt drive 15 from the crankshaft 10 at the rotational speed thereof. The wall 16 of the crankcase 17 which is exposed toward the cooling blower 11 is provided with a channel-shaped recess 18 into which the blower rotor 12 extends and into which it compresses the drawn-in air toward the cylinders 9. The wall 16 of crankcase 17 contains within the crankcase 17 cooling fins 19 to cool the lubricating oil contained therein. The channel-shaped recess 18 is continued into a cooling air duct system 20 formed of pressed sheet metal parts which covers the cylinders 9, extends at the height of the contour of the clutch housing 8 and forms the upper limit of the drive aggregate.

The auxiliary installations and mechanisms of the engine, such as the carburetor 21, the suction-air noise silencer 22, the muffler 23, the fuel pump 24, the ignition coil 25 as well as the ignition distributor 26 are arranged at the internal combustion engine 7 in such a manner that they do not extend in a vertical direction beyond the upper limit formed by the cooling-air guide or duct system 20 or the cooling blower 11 nor beyond the lower limit formed by the crankcase 17. Such a construction results in a space-saving drive aggregate which excells by the relatively low constructional height.

The drive aggregate is covered with respect to the vehicle body 1 by means of a cover 27 which forms an extension of the floor 28 of the vehicle. The cover 27 together with the hinged trunk lid 29 and the rear vehicle seats 30 delimits a space 31 which serves for the accommodation of luggage pieces 32 or the like. When the internal combustion engine 7 needs inspection or readjustment or repairs, then the lid 29 is swung open and a trap 33 provided in the cover 27 is opened so that the engine is freely accessible.

While we have shown and described one specific embodiment in accordance with our invention, it is understood that the same is not limited thereto but is susceptible of many changes and modifications within the spirit of the present invention, and we intend to cover all such changes and modifications except as defined by the appended claims.

We claim:

1. A drive aggregate for motor vehicles with an air cooled internal combustion engine arranged behind the rear axle of the vehicle and on one side of the longitudinal axis thereof, a change-speed transmission connected to said engine and disposed forwardly of said rear axle, said engine being an in-line engine provided with horizontally disposed cylinders and with a crankshaft extending essentially in the longitudinal direction of the vehicle and including a crankcase, and axial blower means for cooling said engine disposed opposite said cylinders with respect to said engine and on the other side of said longitudinal axis and including a blower housing formed at least in part by the outer surfaces of said crankcase to thereby cool the oil in said crankcase by the cooling air supplied by said blower means.

2. A drive aggregate for motor vehicles according to claim 1, wherein said axial blower means includes a twin-blower rotor, and means for driving said twin-blower rotor essentially at the speed of said crankshaft.

3. A drive aggregate for rear-engine motor vehicles according to claim 1, wherein all auxiliary installations for said engine are disposed laterally thereof within the space formed by the upper and lower limiting walls thereof.

4. An air-cooled internal combustion engine provided with a crankshaft and with radial blower means for supplying cooling air, especially for the drive of motor vehicles, comprising a crankcase for said internal combustion engine, said internal combustion engine having essentially horizontally disposed cylinder means extending to one side of said crankshaft, a blower housing for said radial blower means formed in part directly by the outer surfaces of said crankcase, said blower housing being disposed on the side of the crankshaft opposite said cylinder means, further comprising a clutch housing, and a cooling air duct system disposed above said cylinder means, said blower housing passing over into said cooling air duct system, and said cooling air duct system lying within the contours of said clutch housing and constituting the upper limit of said internal combustion engine, whereby the cooling air supplied by said blower means effectively cools both said engine and the oil in said crankcase.

5. An air-cooled internal combustion engine provided with a crankshaft and with radial blower means for supplying cooling air, especially for the drive of motor vehicles, comprising a crankcase for said internal combustion engine, a blower housing for said radial blower means formed in part directly by the outer surfaces of said crankcase whereby the cooling air supplied by said blower means effectively cools the oil in said crankcase, said blower means being constructed as twin-blower having a shaft extending in a direction essentially parallel to said crankshaft, a generator mounted on said shaft, and means operatively connecting said crankshaft with said shaft to thereby drive in unison said blower means and said generator from said crankshaft.

6. A drive aggregate for motor vehicles with an air-cooled internal combustion engine, said engine being an in-line engine provided with horizontally disposed cylinders and with a crankshaft extending essentially in the longitudinal direction of the vehicle near the central longitudinal axis thereof and including a crankcase, an axial blower means for cooling said engine disposed opposite said cylinders with respect to said engine and on the other side of said longitudinal axis and including a blower housing formed at least in part by the outer surfaces of said crankcase to thereby cool the oil in said crankcase by the cooling air supplied by said blower means, the wall of said crankcase facing said blower means being provided with a channel-shaped recess into which said blower means extends.

7. An air-cooled internal combustion engine according to claim 6, wherein said crankcase is provided with cooling fins at the wall thereof facing said blower means to increase the cooling surface for the oil in said crankcase and therewith to increase the cooling effect.

References Cited in the file of this patent

UNITED STATES PATENTS

| | | |
|---|---|---|
| 2,001,029 | Kulick | May 14, 1935 |
| 2,143,889 | Ledwinka | Jan. 17, 1939 |
| 2,175,527 | Klavik | Oct. 10, 1939 |
| 2,237,369 | Seyerle | Apr. 8, 1941 |
| 2,784,794 | Barenyi | Mar. 12, 1957 |

FOREIGN PATENTS

| | | |
|---|---|---|
| 872,978 | France | Mar. 2, 1942 |
| 891,804 | Germany | Oct. 1, 1953 |
| 394,554 | Great Britain | June 29, 1933 |
| 484,439 | Great Britain | May 5, 1938 |
| 220,075 | Switzerland | June 16, 1942 |